United States Patent [19]

Karlock

[11] 4,402,006
[45] Aug. 30, 1983

[54] IMAGE ENHANCER APPARATUS

[76] Inventor: James A. Karlock, 3311 NE. 35th Ave., Portland, Oreg. 97212

[21] Appl. No.: 236,985

[22] Filed: Feb. 23, 1981

[51] Int. Cl.³ .................... H04N 9/535; H04N 5/14
[52] U.S. Cl. ................................ 358/31; 358/37; 358/39; 358/162; 358/166
[58] Field of Search ................. 358/162, 166, 167, 36, 358/37, 38, 39, 31, 4, 8, 127, 170, 310, 328; 364/515; 360/33, 33.1

[56] References Cited

U.S. PATENT DOCUMENTS

| | | | |
|---|---|---|---|
| 2,678,964 | 5/1954 | Loughlin | 178/7.5 |
| 2,921,121 | 1/1960 | Grundmann | 358/38 |
| 3,117,278 | 1/1964 | Johnson | 325/65 |
| 3,207,854 | 9/1965 | Johnson | 179/100.2 |
| 3,286,024 | 11/1966 | Melchior | 358/21 |
| 3,288,930 | 11/1966 | Johnson | 179/1 |
| 3,333,055 | 7/1967 | Krause | 178/6 |
| 3,532,808 | 10/1970 | Fujisawa | 360/33 |
| 3,715,477 | 2/1973 | Olson et al. | 358/36 |
| 3,760,094 | 9/1973 | Skerlos | 358/170 |
| 3,780,215 | 12/1973 | Shibata et al. | 178/5.4 |
| 3,789,133 | 1/1974 | Kline | 178/5.4 |
| 3,798,353 | 3/1974 | Illetschko | 178/5.4 |
| 3,875,537 | 4/1975 | Dolby | 333/28 R |
| 3,952,327 | 4/1976 | Hofman et al. | 358/37 |
| 3,980,819 | 9/1976 | Schwartz | 358/166 |
| 4,003,079 | 1/1977 | Woo | 358/37 |
| 4,009,334 | 2/1977 | Sypula | 358/167 |
| 4,030,121 | 6/1977 | Faroudja | 358/37 |
| 4,071,782 | 1/1978 | Vidovic | 358/31 |
| 4,074,321 | 2/1978 | Miller | 358/37 |
| 4,080,628 | 3/1978 | Jirka | 358/37 |
| 4,096,516 | 6/1978 | Pritchard | 358/37 |
| 4,142,211 | 2/1979 | Faroudja | 358/162 |
| 4,143,397 | 3/1979 | Holmes | 358/31 |
| 4,176,373 | 11/1979 | Dillon et al. | 358/37 |
| 4,198,650 | 4/1980 | Hongu et al. | 358/8 |
| 4,223,339 | 9/1980 | Lagoni et al. | 358/37 |
| 4,223,340 | 9/1980 | Bingham et al. | 358/37 |
| 4,240,103 | 12/1980 | Poetsch et al. | 358/21 R |
| 4,245,238 | 1/1981 | Fuhrer | 358/31 |
| 4,249,202 | 2/1981 | Perry et al. | 358/36 |
| 4,262,304 | 4/1981 | Faroudja | 358/37 |
| 4,268,864 | 5/1981 | Green | 358/166 |

OTHER PUBLICATIONS

"Mark IV Automatic Image Enhancer, Models 8010, 8310 and 8410", *CBS Laboratories Technical Bulletin*, Mar. 1979.

Goldmark and Hollywood, "A New Technique for Improving the Sharpness of Television Pictures", *Journal of the SMPTE*, vol. 57, Oct. 1951, pp. 1314–1322.

McGraw-Hill, *Encyclopedia of Science and Technology*, vol. 5, p. 47, Copyright 1971.

Fink, *Television Engineering Handbook*, McGraw-Hill, New York, 1957, pp. 16-100 through 16-106.

*Primary Examiner*—John C. Martin
*Attorney, Agent, or Firm*—Klarquist, Sparkman, Campbell, Leigh, Whinston & Dellett

[57] ABSTRACT

An image enhancer apparatus includes an aperture correction circuit for receiving an input video signal and producing emphasized edge sharpness information for addition to the input video signal as delayed in a signal delay line. The edge sharpness information is generated employing a pair of further delay lines which provide the second derivative of the input signal. A detail enhancing circuit detects large transitions in the video signal and clamps a differentiated delayed version of the video signal at the output of the signal delay line to suppress large transitions while retaining detail information. Outputs of the aperture correction circuit and the detail enhancing circuit are adjustably combined at the input of a coring circuit which selectively removes undesired noise in order to isolate the desired information. The cored sum is added to the delayed video signal.

16 Claims, 4 Drawing Figures

IMAGE ENHANCER APPARATUS

BACKGROUND OF THE INVENTION

The present invention relates to image enhancing apparatus and particularly to such apparatus suitable for use with a conventional video recorder for improving sharpness and detail aspects of video recording.

Many video recording devices employ a "coring" circuit for eliminating noise in the signal during playback. High frequency, low amplitude information is assumed to be noise and is attenuated, but unfortunately considerable picture detail can be lost in the process. The resultant video picture has a flat look which may include transitions or edges but with much of the detail lacking. When a recording is made from a TV broadcast that is lacking in sharpness, or when a video tape copy is made from information originating from eight millimeter or sixteen millimeter film or from a second generation tape, sharpness as well as detail may be lacking in a resulting tape copy.

According to my application Ser. No. 183,400 filed Sept. 2, 1980, and entitled "VIDEO DETAIL ENHANCING CIRCUIT", an improved video detail enhancing circuit is provided which introduces enhanced detail into a signal channe by means of clamping large transitions in a video signal and relatively amplifying the smaller transitions representing detail. This circuit, while to a degree efficacious in improving sharpness as well, does not give a degree of independent control over sharpness as may be desired, for example, in recording from a broadcast or a tape copy having poor definition. Circuits are known for emphasizing "edge" transitions in a picture signal by differentiation or the like, but generally do not affect the detail information to a desired degree, and hence do not assist in avoiding the "flat" type of recording described above.

SUMMARY OF THE INVENTION

In accordance with the present invention in a preferred embodiment thereof, an image enhancer apparatus includes means for providing a video signal, aperture correction means for receiving the video signal and selectively detecting transitions therein, detail enhancing means for receiving the video signal and suppressing large transitions therein for emphasizing detail, and means for adjustably combining the outputs of the aperture correction means and the detail enhancing means for combination with the video signal. The apparatus preferably includes a coring circuit for receiving the combined aperture corrected and detail enhanced information and reducing noise that may be added, so as to isolate or bracket desired information before addition to the main video signal.

According to the circuit of the present invention, the main or principal video signal is delayed in a delay line for proper timing with emphasized transitional information supplied by circuitry generating the second derivative of the video signal. The detail enhancing means receives the video signal prior to delay for detecting large transitions thereof and suppressing such transitions at an output of said delay line such that substantially only detail information is retained. The outputs of both the detail enhancing means and the aperture correction means are adjustable for obtaining desired enhancement signal values prior to combination and coring by the said coring circuit.

It is accordingly an object of the present invention to provide improved image enhancer apparatus for use with video tape recorders.

It is another object of the present invention to provide improved image enhancer apparatus for use with video tape recorders and the like and by means of which signal sharpness and detail can be brought out either prior to or subsequent to the recording process.

It is another object of the present invention to provide improved image enhancer apparatus wherein video signal picture "edge" information as well as detail can be selectively and adjustably increased and wherein emphasized noise or snow can be adjustably decreased prior to or subsequent to recording.

The subject matter which I regard as my invention is particularly pointed out and distinctly claimed in the concluding portion of this specification. The invention, however, both as to organization and method of operation, together with further advantages and objects thereof, may best be understood by reference to the following description taken on conjunction with the accompanying drawings wherein like reference characters refer to like elements.

DRAWINGS

DETAILED DESCRIPTION

Figure 1:
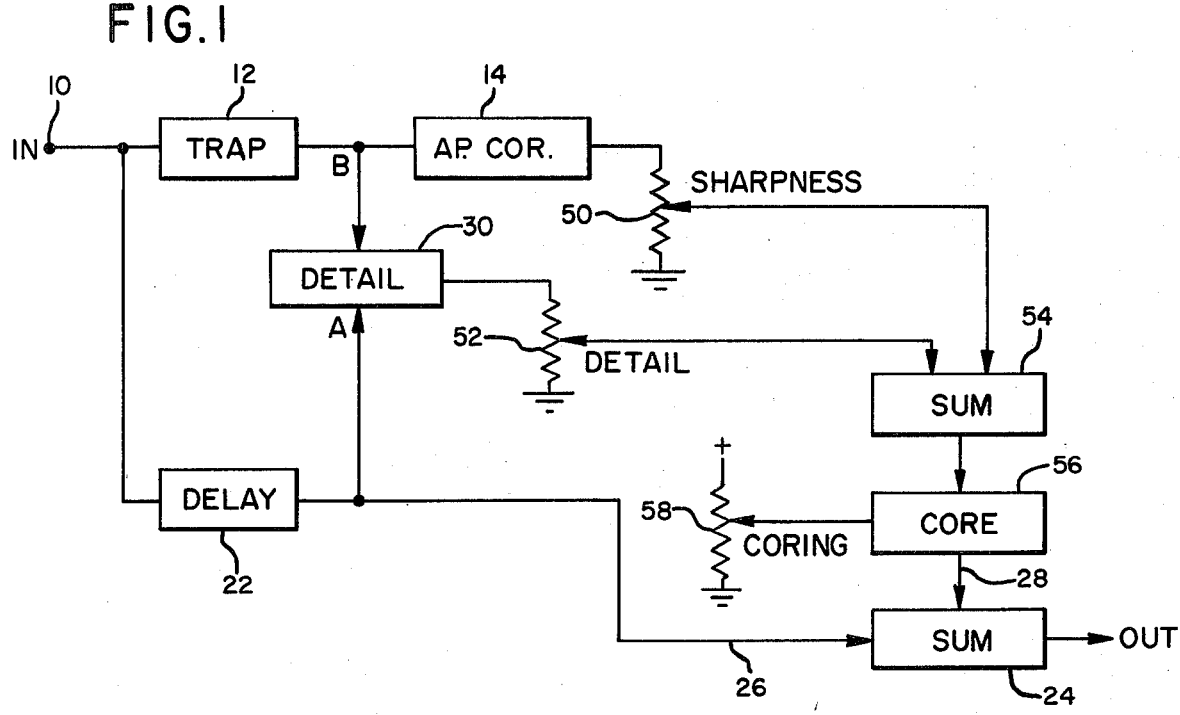
FIG. 1 is a block diagram of image enhancer apparatus according to the present invention.
Figure 2:
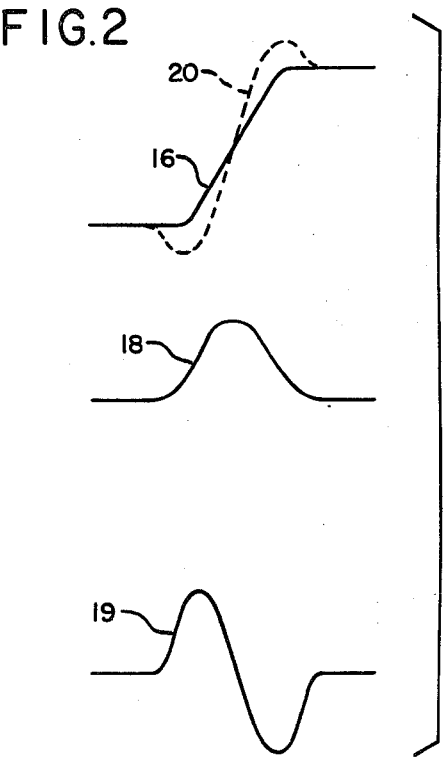
FIG. 2 is a waveform chart illustrating operation of an aperture correction portion of FIG. 1 apparatus.

Referring to the drawings and particularly to FIG. 1, a video input signal is received at input terminal 10 of image enhancer apparatus according to the present invention. The video input signal is coupled via trap 12 for substantially eliminating the chrominance signal at the input of an aperture correction circuit 14. The term, aperture correction relates to correction for the lack of a distinct transition in the signal corresponding to an edge or transition in a video picture, for example from dark to light or light to dark, and is attributable to the fact that the scanning electron beam of a video camera or the like has a finite cross-sectional dimension. Referring to FIG. 2, waveform 16 indicates a transition in the video signal representative of a picture edge, but which has a relatively slow rise time. It would be desirable to emphasize or sharpen this edge for recording purposes. As hereinafter more fully described, aperture correction means 14 receives waveform 16 and first produces a differentiated signal 18. The latter signal is again differentiated to produce second derivative waveform 19. The waveform 19 is then suitably inverted and added to the original input waveform 16 as would be indicated by the dashed line waveform 20 in FIG. 2.

In aperture correction means 14, the double differentiation involves delay and consequently the original input signal from terminal 10 is also delayed by an appropriate amount in delay line 22 before application to output summing circuit 24 on lead 26. The output summing circuit also receives an input on lead 28 including a component corresponding to inverted waveform 19.

The output of delay line 22, comprising the delayed video input signal, is further applied as input A to detail enhancing means 30 also receiving a control signal input B corresponding to undelayed video input. The detail enhancing means suppresses large transitions in video signal input A by means of control input B utilized in suppressing relation to input A. In particular, the detail enhancing means comprises first RC differentiating circuit means for receiving and differentiating signal A, and second RC differentiating circuit means for receiving and differentiating control signal B. Signal B is used in a clamping circuit for suppressing or clamping large transitions in A while retaining smaller transitions representative of picture detail. It will be seen that since the signal A is delayed with respect to control signal B, clamping is effective to substantially eliminate the high amplitude transitions from the output of detail enhancement means 30.

Figure 3:
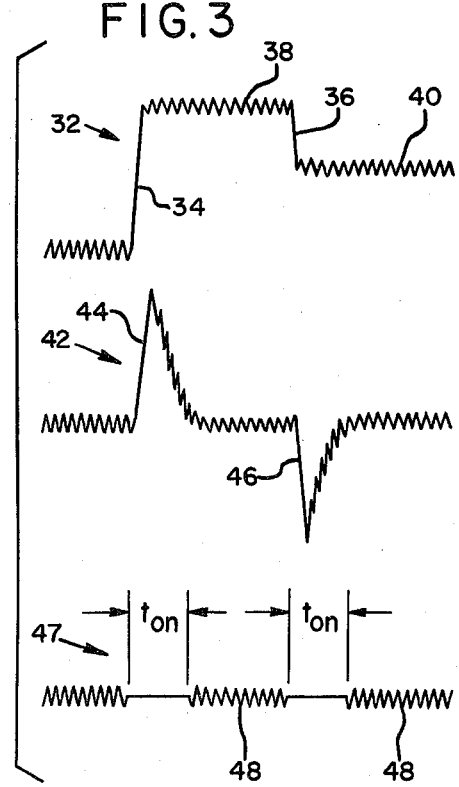
FIG. 3 is a waveform chart illustrating operation of the detail enhancer portion of the FIG. 1 apparatus.

Referring to FIG. 3, waveform 32 is a video input comparable to input A in FIG. 1 including comparatively large transitions 34 and 36 as well as lower amplitude, detail bearing signal information indicated at 38 and 40. Waveform 42 represents the differentiated version of input A which will be subjected to clamping, and it will be seen waveform 42 exhibits fast transitions 44 and 46 having detail information along the trailing edges thereof and therebetween. Waveform 47 then depicts the output of detail enhancing means 30 including signal portions 48 corresponding to small transition information representing picture detail between clamping periods. Clamping periods are designated "$t_{on}$".

The relative amplitude of sharpness information corresponding to picture edges is controlled by potentiometer 50 at the output of aperture correction means 14, and the amplitude of detail enhancement information is controlled by potentiometer 52 at the output of detail enhancement means 30, with the resulting signals being added together in summing circuit 54. The output of summing circuit 54 is applied via coring circuit 56 to the lead 28 input of summing circuit 24. The extent of sharpness enhancement and detail enhancement can be independently governed by potentiometer adjustment in their addition to the original video signal in summing circuit 24.

Coring circuit 56 comprises a threshold circuit adapted to eliminate noise along the signal base line to a desired degree. For instance, anything less than a predetermined small peak-to-peak voltage can be eliminated in coring circuit 56 under the control of coring potentiometer 58. Under some circumstances, the sharpness and detail controls 50 and 52 may be advanced so far that undesired noise is introduced in the output of summing circuit 24. Coring circuit 56 allows the isolation or "bracketing" of the desired sharpness and detail information, while controlling undesired noise.

Figure 4:
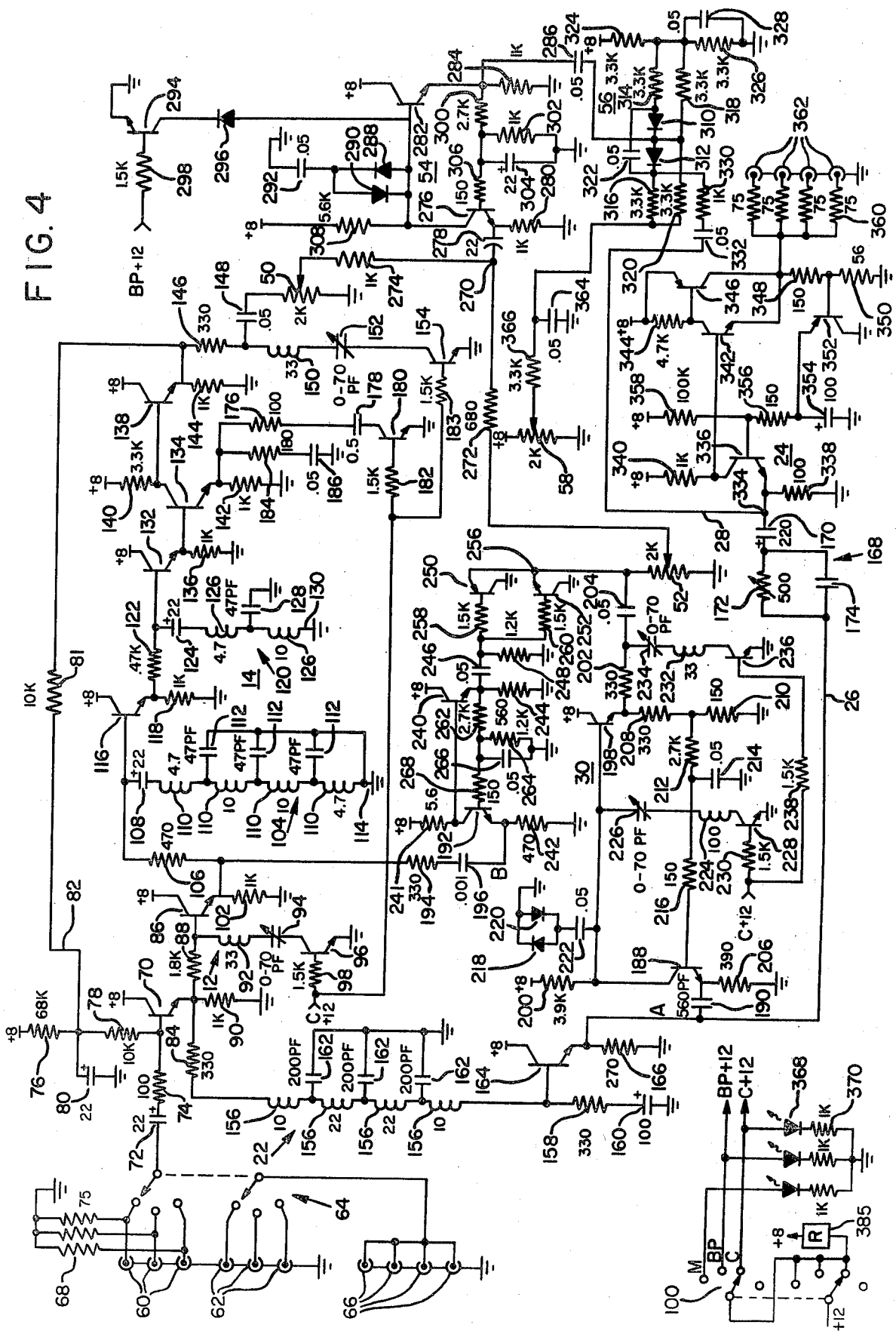
FIG. 4 is a schematic diagram of image enhancer apparatus according to the present invention.

Referring to FIG. 4, showing the circuitry of the present apparatus in greater detail, the video input signal is applied to one of the video input coaxial connectors 60, while an audio input may be applied to one of the input coaxial connectors 62. A ganged selector switch 64 selects one of the input connectors 60 as well as one of the input connectors 62, the audio signal being coupled to output connectors 56. Separate input resistors 68 return the input video connections to ground.

The video output from switch 64 is coupled to the base of emitter follower transistor 70 through the series connection of capacitor 72 and resistor 74, with the base also receiving bias from series resistances 76 and 78 disposed between a positive voltage and the base of transistor 70. The midpoint between the resistors is shunted to ground by capacitor 80 and is further connected to receive bias feedback via lead 82. Emitter follower transistor 70 drives delay line 22 through resistor 84 connected to the emitter of the transistor, and drives the base of transistor 86, forming a part of aperture correction means 14, by way of coupling resistor 88. Resistor 90 returns the emitter of transistor 70 to ground.

Chrominance signal trap 12 comprises an inductance 92 and a capacitor 94 disposed in series between the base of transistor 86 and the collector of a transistor 96 having its emitter returned to ground and its base connected to an input marked C +12 via resistor 98. The series resonant circuit including inductance 92 and capacitor 94 is tuned to the color subcarrier frequency, i.e. 3.58 megahertz for N.T.S.C. signals, for effectively shorting the chrominance signal to ground when transistor 96 is energized in response to selection of color operation (C) by selector switch 100.

Transistor 86, having its emitter returned to ground via resistor 102, drives one end of delay line 104 through coupling resistor 106 and coupling capacitor 108. The delay line comprises series inductances 110 and capacitances 112 interposed between inductance interconnections and ground and thus is a line of the lumped constant type. The remote end of the delay line is shorted to ground at 114. The echo from the shorted end of the delay line causes a resultant waveform at the delay line input which may be considered as the differential of the signal applied. This waveform, illustrated at 18 in FIG. 2, corresponds to an applied video signal rise 16. This circuit suitably has a delay time in the range of 40 to 100 nanoseconds, and in the case of illustrated embodiment the delay time was approximately 64 nanoseconds.

The junction between resistor 106 and capacitor 108 is connected to the base of emitter follower transistor 116 having its emitter returned to ground via resistor 118. The transistor emitter is also connected to the input end of a second delay line 120 through resistor 122 and capacitor 124 in series. This delay line is shorter than delay line 104 but is again of the lumped constant type comprising series inductances 126 with the center tap therebetween being returned to ground through capacitor 128. Line 120 is shorted at remote end 130 for differentiating the signal presented at the input end. Consequently, if a waveform 18 is present at the emitter of transistor 116, a waveform such as illustrated at 19 in FIG. 2 is delivered to the base of transistor 132. Emitter follower transistor 132, the emitter of which is returned to ground with resistor 136, drives the base of transistor 134 forming therewith an approximately times 36 amplifier. Such amplifier supplies an output via further emitter follower transistor 138 which is driven at its base from the collector of transistor 134. The collector and emitter of transistor 134 are respectively returned to a positive voltage and ground by way of resistors 140 and 142, while the emitter of transistor 138 is returned to ground with resistor 144. Emitter follower transistor 138 supplies the aperture correction signal to potentiometer 50 through resistor 146 in series with capacitor 148. Also lead 82 connects the emitter of transistor 138 to bias capacitor 80 via coupling resistor 81.

A phase correcting circuit comprising inductance 150 and capacitor 152 in series is disposed between the midpoint of the resistor 146, capacitor 148 combination and the collector of a transistor 154 having its emitter returned to ground. The base of transistor 154 is also controlled by the C +12 level derived from switch 100 and is consequently "on" only when color operation is selected. The series resonant circuit comprising inductance 150 and capacitor 152 may be tuned to a frequency somewhat below the color subcarrier frequency and the present embodiment was tuned to approximately 3 megahertz. It appears that chrominance signal trap 12, while generally effective for keeping the chrominance signal out of the video correction processing, is less effective on picture edges where there is a change in both phase and amplitude of the color signal. The phase correcting circuit 150, 152 adjusts the phase of the color signal that leaks through the circuit so as to maintain proper phase relationship and avoid undesired edge abberations in the recording or reproduction, and may be tuned higher or lower than 3.58 MHz.

Since some of the signal is removed by the chrominance signal trap, the output signal of the circuit may be reduced in amplitude. Consequently, a circuit including transistor 180 is employed in the emitter of transistor 134 for reducing negative feedback when input C +12 is active. Transistor 134, which includes a bypass circuit comprising capacitor 186 and resistor 184 in series between the emitter of the transistor and ground, also includes a bypass circuit comprising resistor 176 and capacitor 178 disposed between the emitter of transistor 134 and the collector of transistor 180 wherein the emitter of transistor 180 is grounded. When input C +12 is active, transistor 180 is activated via input resistor 182 connected to its base and the additional bypass circuit is inserted.

The twice differentiated or second derivative of the luminance signal at potentiometer 50 emphasizes or picks out, i.e. selectively detects, the transitions in the video signal and is therefore adapted to be added to the original video signal for enhancing "sharpness" to the degree determined by the potentiometer setting. The output of the movable tap of potentiometer 50 is ultimately provided together with enhanced detail information on input lead 28 to adder 24, while the original video signal is provided on lead 26 from delay line 22. Since the operation of the aperture correction means 14 as just described is characterized by delay, then signal delay in delay line 22 compensates therefor such that the emphasized transitions are added in proper time relation to the video signal.

Delay line 22, in the specific embodiment having a delay time of approximately 196 nanoseconds, is comprised of series inductances 156 connected between input resistor 84 and a termination consisting of resistor 148 and capacitor 160 connected in series to ground. Capacitors 162 shunt the interconnections between the inductances to ground for completing the delay line configuration. The delay line drives emitter follower transistor 164 having its emitter returned to ground via resistor 166, the emitter being further connected to lead 26 coupled to summing point 334 of adder 24 via a gain adjusting and coupling circuit 168 comprising capacitor 170 in series with the parallel combination of variable resistor 172 and capacitor 174.

The detail enhancing means 30 as illustrated in FIG. 4 comprises two branches, the first receiving input A (the delayed video input signal) at the emitter of transistor 188 via capacitor 190 from transistor 164, and the second receiving input B (undelayed video input) at the emitter of transistor 192 by way of coupling resistor 194 and coupling capacitor 196 in series from transistor 86. Transistor 188 comprises a common base connected stage, having its emitter returned to ground via resistor 206 and its collector connected directly to the base of transistor 198 as well as being returned to a positive voltage through resistor 200. Capacitor 190 and resistor 200 differentiate the delayed video input signal for in effect producing waveform 42 in FIG. 3 which, in the absence of clamping, would be coupled by way of emitter follower transistor 198 to detail adjusting potentiometer 52 through the series combination of resistor 202 and capacitor 204.

The emitter of transistor 198 is returned to ground through a voltage divider comprising resistors 208 and 210, the center tap of which is coupled through resistor 212 to one terminal of capacitor 214, the remaining terminal being grounded. A resistor 216 connects the junction between resistor 212 and capacitor 214 to the base of transistor 188 to provide DC bias. Inductance 224 and capacitor 226 in series with transistor 228 form a chrominance signal trap which functions in a substantially similar manner to trap 12 hereinbefore discussed so as to eliminate in large part the coupling of the chrominance signal into the detail enhancing means. The chrominance signal trap 224, 226 is operated in response to input C +12 applied to the base of transistor 228 through resistor 230. Similarly, a phase correction circuit comprising inductance 232 in series with capacitor 234 is interposed between the junction of elements 202, 204 and the collector of transistor 236. The phase correction circuit 232, 234 is operated in response to input C +12 applied to the base of transistor 236 through resistor 238.

Transistor 192 is also a common base connected stage having its emitter returned to ground via resistor 242 and its collector connected directly to the base of transistor 240 as well as being returned to a positive voltage through resistor 241. Capacitor 196 and resistor 241 differentiate the undelayed video input signal or provide a high pass filter therefor, also providing a waveform similar to waveform 42 in FIG. 3. However, this waveform, not being subject to delay, occurs in time prior to the waveform 42 at the emitter of transistor 198. The difference in timing is appropriate for substantially eliminating large transitions in the delayed differentiated video signal by means of clamping with the undelayed differentiated video signal for the time periods designated "$t_{on}$" in FIG. 3, leaving the lower amplitude detail information as indicated at 48 in FIG. 3.

For the purpose of clamping, the emitter output of transistor 240 across resistor 244 is coupled to a clamping circuit comprising transistors 250 and 252 through the series combination of capacitor 246 and resistor 258 interposed between the emitter of transistor 240 and the base of transistor 250, with the base of transistor 252 being coupled to the junction between elements 246, 258 by way of resistor 260. Transistors 250 and 252 are of opposite polarity types, i.e. transistor 250 is a PNP transistor while transistor 252 is of the NPN type, both having their collectors grounded and their emitters connected in common to the ungrounded end of potentiometer 52. The circuit constants are chosen such that for large transitions in the video input signal, over a predetermined relatively small amplitude value, transistor 250 or transistor 252 will conduct and substantially eliminate the transitions during the periods "$t_{on}$". It is again noted the clamping starts before the similar rise in the delayed video signal inasmuch as control signal input B is substantially undelayed, and therefore the edges can be substantially suppressed. The proportion or accentuation of the remaining and amplified signal which is to be added to the overall output can be adjusted with potentiometer 52. It is noted the same delay line 22 is employed both for providing the desired time relationship between delayed video and the clamping signal in the detail enhancing means 30 as is employed for providing the proper time relationship between delayed video and sharpness information.

The detail enhancement circuit includes a prelimiter circuit comprising parallel, reversely poled diodes 218 and 220 connected in series with capacitor 222 between the collector of transistor 188 and ground. The diodes shunt very large transitions and reduce the requirements on clamping transistors 250 and 252. This circuit assures the clamping transistors don't encounter voltages above about 0.7 volts peak-to-peak.

A DC biasing circuit for transistor 192 includes a voltage divider comprising resistors 262 and 264 disposed between the emitter of transistor 240 and ground. A capacitor 266 is interposed between the junction of resistors 262, 264 and ground and the same junction is connected to the base of transistor 192 with resistor 268. In the detail enhancing means, differentiating and high pass filtering are used as equivalent terms.

Before combination with the delayed video input signal in adding circuit 24, the output of aperture correction means 14 and the output of detail enhancing means 30 are combined in adder circuit 54. The movable tap of potentiometer 50 is coupled to summing point 270 through resistor 274, while the movable tap of potentiometer 52 is coupled to the same summing point by way of resistor 272. A capacitor 278 is interposed between summing point 270 and the emitter of common base connected transistor 276, said emitter being returned to ground employing resistor 280. The collector of transistor 276 is connected directly to the base of emitter follower transistor 282 as well as being returned to a positive voltage through resistor 308. A clipping circuit comprising paralleled, reversely poled diodes 228 and 290 in series with capacitor 292 is interposed between the collector of transistor 276 and ground. The emitter of transistor 282 is returned to ground with resistor 284. A DC biasing circuit for transistor 276 includes voltage divider resistors 300, 302 between the emitter of transistor 282 and ground with capacitor 304 shunting resistor 302. Resistor 306 couples the junction between resistors 300, 302 to the base of transistor 276.

A disabling circuit or bypass circuit comprises transistor 294 having its emitter grounded and its collector connected to the base of transistor 282 by means of diode 296, the cathode of which is connected to the collector of transistor 294. An input BP +12 is applied to the base of transistor 294 through resistor 298 in response to actuation of switch 100 to the bypass position whereby the combined outputs of the aperture correction means and the detail enhancement means can in effect be shunted to ground. Otherwise, with the switch in the C or M position, the combination of the aperture correction and detail signals is coupled through capacitor 286 to coring circuit 56 wherein undesired noise which may have been introduced by a high gain setting of potentiometer 50 and/or potentiometer 52 may be reduced or eliminated.

The coring circuit 56 includes a series connection of resistor 324, resistor 314, diode 310, diode 312, resistor 316, resistor 366 and a portion of potentiometer 58, said series connection being disposed between a positive voltage and ground. The input via capacitor 286 from the emitter of transistor 282 is connected to the junction between the diodes, i.e. to the cathode of diode 310 and the anode of diode 312, while the output of the circuit is coupled via the series combination of resistor 330 and capacitor 332 either from the cathode of diode 312, or from the anode of diode 310 by way of capacitor 322. The potentiometer 58 biases diodes 310 and 312 to determine the positive and negative points on either side of the base line at which conduction between circuit input and output begins. If potentiometer 58 is set at about the same voltage point as determined by the center tap of the voltage divider comprising resistors 324 and 326 connected between a positive voltage and ground, then the output terminals of diodes 310 and 312 are biased to approximately the same DC voltage as their input terminals, whereby diode 312 will conduct for positive input excursions greater than diode drop voltage above the base line. If potentiometer 58 is set differently so as to cause continuous conduction in the diodes or to overcome some or part of the diode drop, then less of the signal will be inhibited from reaching the output and more of the noise signal or the like will reach the output. Similarly, if potentiometer 58 is adjusted so that the diodes 310, 312 receive a back bias, then this must be overcome by the signal and more of the signal around the base line will be inhibited from reaching the output. In the circuit, capacitors 328 and 364 contribute to maintaining substantially DC voltage levels at either end of the voltage divider comprising resistors 318, 320 establishing a DC "no-input" voltage at the center point between diodes 310, 312, and keeping the coring action symmetrical.

The action of the coring circuit 56 is to eliminate base line noise or snow. As hereinbefore mentioned, a recorder with which the present apparatus is to be used may also include a coring circuit wherein detail is removed as well as noise, and therefore the extent of coring is to a degree objectionable. However, when aperture correction and/or detail enhancement may be emphasized to a high degree as in the present apparatus, as when potentiometers 50 and 52 are "turned up", noise may be accentuated. Coring circuit 54 can then be used to eliminate the added noise or snow around the base line without eliminating the advantage provided by aperture correction and detail enhancement. Thus, the desired additions to the video signal can be isolated or "bracketed" and coupled into the output adder circuit 24 without adding excessive noise.

The output adding circuit 24 includes summing point 334 receiving the original video signal as delayed via lead 26 and the output of the coring circuit on lead 28. The output summing circuit also provides an output at a predetermined voltage level. Transistor 336 comprises a common base connected stage, the collector of which is connected directly to the base of transistor 342 and returned to a positive voltage point through resistor 340. Transistor 342 comprises part of a compound emitter follower circuit or voltage follower circuit together with transistor 346, the emitter and base of which are connected to a positive voltage and to the collector of transistor 342 respectively. The collector of transistor 342 is supplied via resistor 344 from the source of positive voltage while the collector of transistor 346 is returned to ground through a voltage divider comprising resistors 348 and 350 in series. The emitter of transistor 342 is connected to the collector of transistor 346 and this point provides the output for the apparatus via coupling resistors 360 connected to coaxial connectors 362.

The collector of transistor 346 is also coupled to the base of feedback transistor 352 having its collector grounded, its base connected to the midpoint between resistors 348, 350, and its emitter connected to the junction between capacitor 354 and resistor 356 wherein capacitor 354, resistor 356 and resistor 358 are disposed in series between ground and the positive voltage supply. It is noted the resistances of resistors 348 and 350 have approximately a three-to-one ratio for optimum performance. The base of common base connected transistor 336 is connected to the junction between resistors 356 and 358 for setting the base bias. Transistor 352 and capacitor 354 are utilized for sync tip clamping and adjust the levels in the circuit such that the horizontal sync tips of the video signal are at a predetermined level, while the remainder of the video signal at the collector of transistor 346 varies above this level. Should the sync tip drop below such level, transistor 352 conducts for discharging capacitor 354 to provide the clamping or DC restoring action. While a transistor 352 is preferred, it will be appreciated that another unidirectionally conducting semiconductor device such as a diode should be substituted therefor in respect to charging clamping capacitor 354 at the sync tips, with the same polarities being observed.

The circuit 168 in lead 26 between the emitter of transistor 164 and summing point 334 is ordinarily used for adjusting the gain at the outout connectors 362 of the apparatus with respect to input video connectors 60. Resistor 172 is adjusted and capacitor 174 is chosen so that unity gain is maintained for the main video signal coupled through the delayed path including lead 26. This unity gain output will be delivered for example when switch 100 is in the bypass position. At any time, the proportion of the main video signal delivered to the combination output is maintained at unity gain level.

The upper portion of switch 100 selectively provides a positive twelve volts to either the BP +12 connection, the C +12 connection, or to neither of these connections according to the mode desired. The top selection terminal of the switch, marked M, is for monochromatic operation in which case the color traps such as trap 12 and the phase correction circuits need not be activated. In the second position, output BP +12 is activated for the bypass mode. In the third position, the C +12 terminals are energized for operating the color traps and attendant circuitry. The last or bottom position is the off position. In each of the top three positions, one of the light emitting diodes 368 is also energized through one of resistors 370 providing indicating panel lights for informing the operator of the mode being used. The lower gang of the switch supplies positive operating voltage to the respective circuits via regulator 385, except in the off position.

Briefly reviewing the operation of the apparatus according to the present invention, an input video signal is coupled from coaxial connector 60 to coaxial connector 362 with unity gain, but with an added detail signal and/or an added sharpness accentuating signal supplied in proportion to the setting of potentiometers 52 and 50 respectively. The delay in the main video signal brought about via delay line 22 is not only efficacious in making possible the proper timing of the doubly differentiated signal from the aperture correction circuit with respect to the main video, but also provides time for clamping large transitions in the detail enhancing circuit means by detection thereof prior to the exit of input A from the delay line. Consequently, the output of the detail enhancing circuit at potentiometer 52 is substantially entirely enhanced detail information. The combined detail enhancement and sharpness accentuating information added in adder circuit 54 may be cored by coring circuit 56 so as to remove or reduce snow or other high frequency luminance noise as may be brought out by high enhancement settings.

The circuit according to the present invention is appropriate for use in circuit with either the input or output of a video tape recorder. Not only does the apparatus according to the present invention provide an improved image on a TV monitor when the output of a tape recorder is coupled therethrough, but also the apparatus according to the present invention may be employed between a tuner and a recorder for pre-accentuating desired information and making up for deficiencies in the recorder. If a broadcast to be recorded is somewhat lacking in sharpness and/or detail, it is particularly desirable these factors be accentuated in recording. Further, the apparatus may be employed in the input or output of tape recorders used in copying or dubbing tapes to maintain or even improve the copy quality.

Circuit component values indicated in FIG. 4, wherein resistance is in ohms, capacitance is in microfarads and inductance is in microhenries unless otherwise indicated, are by way of example for a specific embodiment only.

While I have shown and described a preferred embodiment of my invention, it will be apparent to those skilled in the art that many changes and modifications may be made without departing from my invention in its broader aspects. I therefore intend the appended claims to cover all such changes and modifications as fall within the true spirit and scope of my invention.

I claim:

1. Image enhancer apparatus comprising:
    means for providing a video signal,
    aperture correction means for receiving said video signal and selectively detecting transistions in said video signal by providing an output corresponding to the second derivative of said video signal;
    detail enhancing means for receiving said video signal and providing an output having large transitions in said video signal suppressed while retaining transitions representing detail,
    and means for combining the outputs of said aperture correction means and said detail enhancing means with said video signal.

2. The apparatus according to claim 1 wherein said means for combining includes preliminary combining means for combining said output of said aperture correction means with the output of said detail enhancing means before combination with said video signal, and including coring means for processing the output of said preliminary means before said combination with said video signal, said coring means being adapted to remove low amplitude noises from the combined output of said preliminary means.

3. The apparatus according to claim 2 wherein said coring means comprises a pair of circuit paths respectively including oppositely poled diodes through either of which the output of said preliminary combining means may pass, and means for supplying an adjustable d.c. voltage across said diodes in series for determining the level at which said diodes conduct to couple the output of said preliminary combining means.

4. The apparatus according to claim 1 wherein said aperture correction means is characterized by circuit delay,
   and including means for delaying said video signal before combination in said means for combining,
   said detail enhancing means receiving as its input signal said video signal from said means for delaying, and receiving the undelayed video signal as a control signal for suppressing large transitions in the delayed signal.

5. The apparatus according to claim 4 wherein said detail enhancing means comprises first RC differentiating circuit means for receiving and differentiating said delayed video input signal, second RC differentiating circuit means for receiving and differentiating the undelayed video signal, and clamping circuit means operating in response to the differentiated undelayed signal for clamping large transitions in the differentiated delayed signal.

6. The apparatus according to claim 5 wherein said detail enhancing means further includes a prelimiter circuit including reversely poled diodes connected for shunting the output of said first RC differentiating circuit for presuppressing larger transitions in the differentiated delayed signal.

7. The apparatus according to claim 1 wherein said aperture correction means and said detail enhancing means are provided with circuitry for shunting chrominance signal information from aperture correction and detail enhancement processing, the circuitry comprising resonant circuitry tuned substantially to the color subcarrier frequency.

8. The apparatus according to claim 7 wherein said aperture correction means and said detail enhancing means are further provided in another stage thereof with phase correction circuitry disposed in shunting relation with said stage and comprising a resonant circuit tuned to a frequency different from the color subcarrier frequency for correcting residual phase errors left by said resonant circuitry tuned substantially to the color subcarrier frequency.

9. The apparatus according to claim 1 wherein said aperture correction means includes first and second shorted delay line circuits connected in cascaded relation for respectively producing the first and second derivatives of said video signal, the first delay line circuit having a delay time in the range of 40 to 100 nanoseconds, and the second delay line circuit having a delay time in the range of 15 to 40 nanoseconds.

10. Image enhancer apparatus comprising:
    first means for providing a video signal,
    second means for delaying said video signal,
    third means receiving said video signal as delayed for differentiating the same,
    fourth means receiving said video signal as undelayed for differentiating the same to provide a control signal,
    and fifth means receiving the delayed and differentiated signal from said third means and responsive to said control signal from said fourth means for suppressing large transitions in said delayed and differentiated signal while retaining information representing picture detail.

11. Video circuit apparatus comprising:
    first means for providing a video signal,
    second circuit means for processing said video signal,
    third chrominance signal trapping means comprising a resonant circuit tuned substantially to the color subcarrier frequency for filtering chrominance signal information from said second circuit means,
    and fourth phase correction circuit means concurrently operable with said third means and comprising a resonant circuit connected with said second circuit means in a different stage thereof from said third means, the last mentioned resonant circuit being tuned to a frequency detuned from said color subcarrier frequency for correcting residual phase errors left by said trapping means.

12. Image enhancer apparatus comprising:
    first means for providing a video signal,
    second circuit means for suppressing portions of said video signal to provide an output with large transitions suppressed while retaining detail information,
    third means for adding the output of said second circuit means to said video signal,
    fourth chrominance signal trapping means comprising a resonant circuit tuned substantially to the color subcarrier frequency for filtering chrominance signal information from said second circuit means,
    and fifth phase correction circuit means concurrently operable with said fourth means and comprising a resonant circuit connected with said second circuit means in a different stage thereof from said fourth means, the last mentioned resonant circuit being tuned to a frequency different from said color subcarrier frequency for correcting residual phase errors left by said trapping means.

13. Image enhancer apparatus comprising:
    first means for providing a video signal,
    second circuit means for receiving said video signal and selectively detecting transitions in said video signal,
    third means for adding the output of said second circuit means to said video signal,
    fourth chrominance signal trapping means comprising a resonant circuit tuned substantially to the color subcarrier frequency for filtering chrominance signal information from said second circuit means,
    and fifth phase correction circuit means concurrently operable with said fourth means and comprising a resonant circuit connected with said second circuit means in a different stage thereof from said fourth means, the last mentioned resonant circuit being tuned to a frequency different from said color subcarrier frequency for correcting residual phase errors left by said trapping means.

14. Image enhancer apparatus comprising:
    first means for providing a video signal,
    second circuit means for deriving high frequency components of said video signal and for suppressing portions of said high frequency components to provide an output with large transitions suppressed while retaining detail information,
    third means for adjustably coring the output of said second means, said third means being adapted to remove low amplitude noise from the output of said second means,
    and fourth means for adding the output of said third means to said video signal.

15. Image enhancer apparatus comprising:
    first means for providing a video signal,
    second means for receiving said video signal and selectively detecting transitions in said video signal, including means for providing an output from said second means, third means for receiving said video signal and deriving high frequency components of said video signal for suppressing large transitions representing edges in said video signal while retaining detail information, including means for providing an output from said third means, and fourth means for receiving and combining the outputs of said second and third means with said video signal.

16. The apparatus according to claim 15 including further means interposed between said third means and said fourth means for removing low amplitude noise from the outputs of the second and third means before combination with the video signal.

* * * * *